United States Patent
Bayer et al.

(10) Patent No.: US 9,541,018 B2
(45) Date of Patent: Jan. 10, 2017

(54) ENGINE CYLINDER BANK-TO-BANK TORQUE IMBALANCE CORRECTION

(71) Applicants: Ethan E Bayer, Lake Orion, MI (US); Ayman Ismail, Westland, MI (US); David A Lawrence, Clarkston, MI (US)

(72) Inventors: Ethan E Bayer, Lake Orion, MI (US); Ayman Ismail, Westland, MI (US); David A Lawrence, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/851,033

(22) Filed: Sep. 11, 2015

(65) Prior Publication Data

US 2016/0076471 A1 Mar. 17, 2016

Related U.S. Application Data

(60) Provisional application No. 62/050,427, filed on Sep. 15, 2014.

(51) Int. Cl.
 *F01L 1/34* (2006.01)
 *F02D 41/00* (2006.01)
 (Continued)

(52) U.S. Cl.
 CPC ........... *F02D 41/0082* (2013.01); *F02B 75/22* (2013.01); *F02D 13/0226* (2013.01);
 (Continued)

(58) Field of Classification Search
 CPC .... F01L 1/34; F01L 2013/111; F01L 2800/11; F01L 2820/041; F01L 2820/042; F02D 13/0238; F02D 41/0082; F02D 41/1443; F02D 41/1454
 (Continued)

(56) References Cited

U.S. PATENT DOCUMENTS

| | | | |
|---|---|---|---|
| 7,568,458 B2 * | 8/2009 | Roth | F01L 1/3442 123/90.15 |
| 7,627,418 B2 | 12/2009 | Pallett et al. | |

(Continued)

FOREIGN PATENT DOCUMENTS

| | | |
|---|---|---|
| DE | 102006014358 A1 | 10/2006 |
| EP | 1267058 A2 | 12/2002 |

(Continued)

OTHER PUBLICATIONS

International Search Report and Written Opinion dated Dec. 15, 2015 for International Application No. PCT/US2015/049913, International Filing Date Sep. 14, 2015.

*Primary Examiner* — Ching Chang
(74) *Attorney, Agent, or Firm* — Ralph E. Smith

(57) ABSTRACT

An engine bank-to-bank airflow balancing technique includes calculating current and offset volumetric efficiencies of the engine and calculating a slope representing (i) a difference between the offset and current volumetric efficiencies and (ii) a difference between offset and current intake camshaft positions. Based on the respective exhaust gas oxygen concentrations, the technique involves calculating a volumetric efficiency correction corresponding to each cylinder bank and based on the slope and the volumetric efficiency corrections, calculating target intake camshaft position shifts. The technique further involves controlling offsets of the intake camshafts based on the target intake camshaft position shifts. After a predetermined number of target intake camshaft position shifts are determined and stored with respect to various combinations of engine speed and a ratio of intake manifold pressure to barometric pressure, final intake camshaft position shifts may be determined and utilized when determining the intake camshaft positions.

20 Claims, 2 Drawing Sheets

(51) Int. Cl.
*F02D 41/14* (2006.01)
*F02D 13/02* (2006.01)
*F02B 75/22* (2006.01)
*F02D 41/24* (2006.01)
*F01L 13/00* (2006.01)

(52) U.S. Cl.
CPC ..... *F02D 13/0238* (2013.01); *F02D 41/1443* (2013.01); *F02D 41/1454* (2013.01); *F02D 41/2451* (2013.01); *F01L 1/34* (2013.01); *F01L 2013/111* (2013.01); *F01L 2800/11* (2013.01); *F01L 2820/041* (2013.01); *F01L 2820/042* (2013.01); *F02D 41/0085* (2013.01); *F02D 41/1405* (2013.01); *F02D 41/2454* (2013.01); *F02D 2041/001* (2013.01); *F02D 2200/0411* (2013.01)

(58) Field of Classification Search
USPC .......................................... 123/90.15, 90.17
See application file for complete search history.

(56) References Cited

U.S. PATENT DOCUMENTS

| | | |
|---|---|---|
| 8,209,109 B2 | 6/2012 | Storhok et al. |
| 2003/0209235 A1 | 11/2003 | Javaherian |
| 2005/0005923 A1 | 1/2005 | Herrin |
| 2014/0288802 A1 | 9/2014 | Katayama et al. |

FOREIGN PATENT DOCUMENTS

| | | |
|---|---|---|
| EP | 1384872 A1 | 1/2004 |
| EP | 1593825 | 9/2009 |

* cited by examiner

ENGINE CYLINDER BANK-TO-BANK TORQUE IMBALANCE CORRECTION

CROSS-REFERENCE TO RELATED APPLICATIONS

The present application claims the benefit of U.S. Provisional Application No. 62/050,427, filed on Sep. 15, 2014. The disclosure of this application is incorporated herein by reference in its entirety.

FIELD

The present application relates to engine systems and, more particularly, to techniques for engine cylinder bank-to-bank torque imbalance correction.

BACKGROUND

Internal combustion engines for vehicles include a plurality of cylinders. For V-type engines, the cylinders are divided into two banks of cylinders that are arranged at an angle with respect to each other. Some examples of V-type engines are V6 engines (two banks of 3 cylinders each), V8 engines (two banks of 4 cylinders each), and V10 engines (two banks of 5 cylinders each). In order to improve performance, fuel economy, and/or emissions, V-type engines could incorporate variable valve lift (VVL) systems. VVL systems enables engines to alter their peak valve lift and opening duration depending on operating conditions. In overhead camshaft V-type engines, two different intake camshafts are utilized for the two cylinder banks. Each intake camshaft actuates a separate set of rockers arms, which in turn actuate a separate set of intake valves for a respective cylinder bank.

In one implementation, a two-step VVL system utilizes specifically configured rocker arms and tri-lobe intake camshafts to provide for valve lift and opening duration to be toggled between two modes: a default or low lift mode and a high lift mode. In the low lift mode, the two outer cam lobes engage the rocker arm, which actuates the intake valves. If the high lift mode is desired, an oil pressure regulating solenoid or valve supplies oil to the rocker arm assembly, which pushes a pin under the rocker arm to allow the middle lobe of the tri-lobe camshaft to engage the rocker arm and actuate the intake valve. This VVL system allows the V-type engine to effectively have both a performance mode (the high lift mode) and an efficiency mode (the low lift mode). Low valve lift provides for fuel economy increases by reducing V-type engine pumping work, while high lift enables or provides for increased performance (e.g., increased power).

During operation of a V-type engine with this two-step VVL system in the low lift mode, there could be a greater sensitivity to any cylinder bank to cylinder bank airflow imbalance. For example, when in low lift mode, the intake valves are open for a reduced period of time with a reduced peak valve lift. As a result, if there is any difference in the opening point of the intake valves on one cylinder bank compared to the other cylinder bank, there could be a significant difference in the total amount of air inducted into each cylinder bank, and thus the torque produced by each cylinder bank. If there is a significant difference in the torque produced by each cylinder bank, then V-type engine stability could decrease, which may compromise fuel economy, performance, emissions, and/or NVH. Accordingly, there is a need for improvement in the relevant art.

SUMMARY

In one exemplary aspect of the invention, a control system for an engine having two banks of cylinders associated with two intake camshafts is presented. In an exemplary implementation, the control system includes intake camshaft position sensors each configured to measure a current position of a respective intake camshaft, exhaust gas oxygen concentration sensors each configured to measure an oxygen concentration of an exhaust gas produced by a respective cylinder bank, and a controller configured to detect a precondition for performing engine airflow balancing. In one exemplary implementation, the controller is further configured to, in response to detecting the precondition: based on the current intake camshaft positions and offset intake camshaft positions, calculate current and offset volumetric efficiencies of the engine, the offset intake camshaft positions being a calibratable offset from the current intake camshaft positions; calculate a slope representing a ratio of (i) a difference between the offset and current volumetric efficiencies and (ii) a difference between the offset and current intake camshaft positions; based on the respective exhaust gas oxygen concentrations, calculate a volumetric efficiency correction corresponding to each cylinder bank; based on the slope and the volumetric efficiency corrections, calculate target intake camshaft position shifts; and based on the target intake camshaft position shifts, control offsets of the intake camshafts.

In one exemplary aspect of the invention, a method for operating an engine having two banks of cylinders associated with two intake camshafts is presented. In an exemplary implementation, the method includes receiving, by a controller from intake camshaft position sensors, current positions of respective intake camshafts, receiving, by the controller from exhaust gas oxygen concentration sensors, oxygen concentrations of an exhaust gas produced by respective cylinder banks, and detecting, by the controller, a precondition for performing engine airflow balancing. In one exemplary implementation, the method further includes in response to detecting the precondition: based on the current intake camshaft positions and offset intake camshaft positions, calculating, by the controller, current and offset volumetric efficiencies of the engine, the offset intake camshaft positions being a calibratable offset from the current intake camshaft positions; calculating, by the controller, a slope representing a ratio of (i) a difference between the offset and current volumetric efficiencies and (ii) a difference between the offset and current intake camshaft positions; based on the respective exhaust gas oxygen concentrations, calculating, by the controller, a volumetric efficiency correction corresponding to each cylinder bank; based on the slope and the volumetric efficiency corrections, calculating, by the controller, target intake camshaft position shifts; and based on the target intake camshaft position shifts, controlling, by the controller, offsets of the intake camshafts.

In some implementations, the controller is further configured to: calculate a ratio of each volumetric efficiency correction to the slope to obtain raw intake camshaft shifts, wherein each raw intake camshaft position shift is configured to cause airflow balance between the cylinder banks; and calculate half of a difference between the raw intake camshaft position shifts to obtain a single target intake camshaft position shift for each intake camshaft.

In some implementations, the controller is configured to control the offsets of the intake camshafts by: offsetting a first one of the intake camshafts by the single target intake camshaft position shift in a first direction; and offsetting a second one of the intake camshafts by the single target intake camshaft position shift in a second direction opposing the first direction.

In some implementations, the controller is further configured to apply a gain to the single target intake camshaft position shift such that the offsetting of the first and second intake camshafts is performed incrementally by accumulating portions of the intake camshaft position shifts with previous intake camshaft position shifts.

In some implementations, the controller is further configured to, subsequent to the controlling: recalculate, based on the exhaust gas oxygen concentrations, the volumetric efficiency corrections; and compare a difference between the recalculated volumetric efficiency corrections to a threshold indicative of an acceptable difference in volumetric efficiencies between the cylinder banks, wherein the controller is configured to store the target intake camshaft position shifts when the difference between the recalculated volumetric efficiency corrections is below the threshold.

In some implementations, the controller is configured to store, in a cell of the memory, the target intake camshaft position shifts with respect to a particular combination of (i) engine speed and (ii) a ratio of engine intake manifold pressure to barometric pressure.

In some implementations, the controller is further configured to determine whether a predetermined number of cells of the memory are filled with target intake camshaft position shifts each with respect to a different combination of (i) engine speed and (ii) the ratio of engine intake manifold pressure to barometric pressure.

In some implementations, in response to determining that the predetermined number of cells of the memory are filled, the controller is further configured to calculate final target intake camshaft position shifts by calculating an average of all the respective target intake camshaft position shifts stored in the memory.

In some implementations, the controller is further configured to utilize the final target intake camshaft position shifts when determining the intake camshaft positions.

In some implementations, the controller is further configured to calculate the current and offset volumetric efficiencies based further on (i) centerline positions of the intake camshafts, (ii) engine speed, and (iii) a ratio of engine intake manifold pressure to barometric pressure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
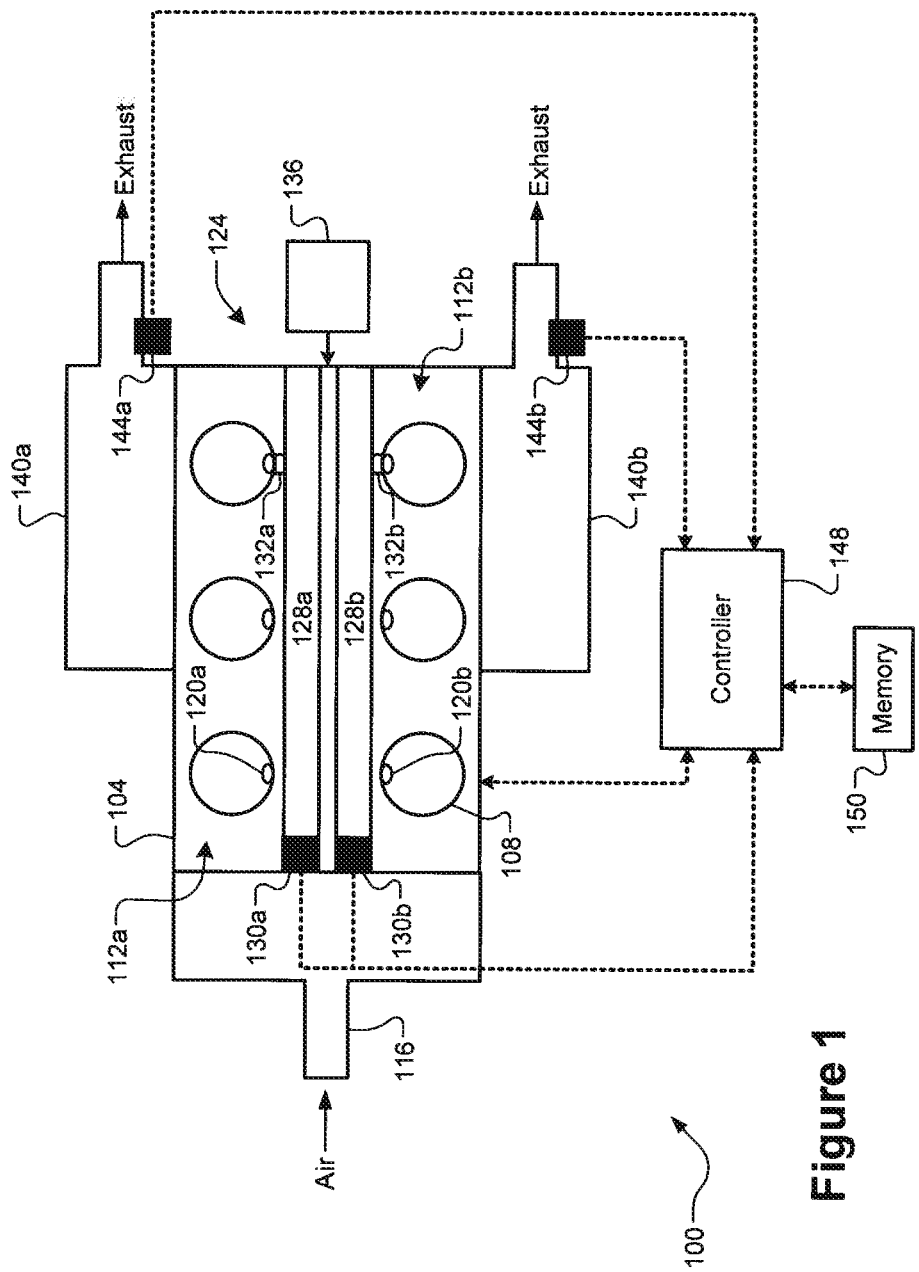
FIG. 1 is a diagram of an example V-type engine system according to the principles of the present disclosure.

As mentioned above, there could be a greater sensitivity to any cylinder bank to cylinder bank airflow imbalance while operating a V-type engine with a two-step variable valve lift (VVL) system in a low lift mode. As a result, if there is any difference in the opening point of the intake valves on one cylinder bank compared to the other cylinder bank, there could be a significant difference the torque produced by each cylinder bank. The differences in opening points in the intake valves on each cylinder bank could be primarily due to the tolerance stack-up differences in the components (camshafts, cam phasers, cylinder heads, timing chains, etc.) on each cylinder bank of the V-type engine. Thus, there could potentially be prohibitive costs to reduce the tolerance stack-up of all of these components beyond already refined levels.

Accordingly, control techniques are presented for controlling (e.g., mitigating or eliminating) torque imbalance between cylinder banks of a V-type engine with a VVL system. These techniques generally involve determining, based on exhaust gas oxygen concentration, intake camshaft position shifts that balance engine torque across two cylinder banks. In one exemplary implementation, the control techniques are based on a determined correlation between cylinder bank-to-bank airflow imbalance and cylinder bank-to-bank torque imbalance. In this exemplary implementation, the cylinder bank-to-bank torque imbalance is corrected via feedback control utilizing the determined correlation between volumetric efficiency correction terms and an intake camshaft centerline shift. It will be appreciated that the term "volumetric efficiency" as used herein can refer to any representative airflow-based metric that could be used, in conjunction with exhaust gas oxygen concentration, to determine intake camshaft position shifts that balance engine torque across two cylinder banks. It will also be appreciated that the volumetric efficiencies or other airflow-based metrics can be calculated using models other than an artificial neural network (ANN), which is described in greater detail herein.

The control techniques determine gains in the form of intake camshaft centerline shifts required to provide for each cylinder bank to achieve the same volumetric efficiency and thereby substantially mitigate or eliminate cylinder bank-to-bank torque imbalance. This is achieved, in one exemplary implementation, by adjusting the positions of the intake camshafts on each cylinder bank by a determined amount, which equalizes the bank-to-bank airflow. In one exemplary implementation, the method utilizes the determined linear relationship between engine volumetric efficiency and intake camshaft position, when in the low valve lift mode. In one exemplary implementation, other precondition criteria may be required, such as parameters indicative of the engine being in a stable operating condition. With this determined linear relationship, one exemplary implementation utilizes exhaust gas oxygen concentration feedback to directly calculate the target intake camshaft position shifts to balance bank-to-bank airflow. The intake camshaft adjustments or "shifts" are then performed via control software, i.e., the intake camshaft positions are offset by the target intake camshaft position shifts.

Referring now to FIG. 1, a diagram of a V-type example engine system 100 is illustrated. The V-type engine system 100 includes a V-type engine 104. For purposes of simplicity, the V-type engine system 100 and the V-type engine 104 are hereinafter referred to as "engine system 100" and "engine 104," respectively. The engine 104 is any suitable internal combustion engine having a plurality of cylinders 108 divided into two cylinder banks 112a and 112b (collectively "cylinder banks 112"). While six cylinders are shown, it will be appreciated that other even numbers of cylinders could be implemented (4, 8, 10, 12, etc.). In one exemplary implementation, the cylinder banks 112 are arranged at an angle with respect to each other. The engine 104 draws in air through an induction system 116. The air is distributed to the cylinders 108 via respective intake valves 120a, 120b (collectively "intake valves 120") that are actuated by a VVL system 124. In one exemplary implementation, the VVL system 124 is a two-step VVL system, as more fully described below.

For a two-step VVL system, intake camshafts 128a, 128b (collectively "intake camshafts 128") having multiple lobes (e.g., a tri-lobe configuration) actuates respective sets of rocker arms 132a, 132b (collectively "rocker arms 132"). In turn, the rocker arms 132 actuate the respective intake valves 120. Intake camshaft position sensors 130a and 130b (collectively "intake camshaft position sensors 130") are configured to measure a rotational position of the respective intake camshafts 128. In a default or low lift mode, a hydraulic actuation system 136 actuates the rocker arms 132 such that they are actuated by a subset of the respective lobes of the intake camshafts 128. In a high lift mode, the hydraulic actuation system 136 controls the rocker arms 132 such that they are actuated by respective lobes of the intake camshafts 128, thereby providing an increased peak lift. In one exemplary implementation, the hydraulic actuation system 136 achieves this increased peak lift by pumping hydraulic fluid to the respective rocker arms 132 to actuate respective pins that alter the orientation of the respective rocker arms.

The engine 104 can also include one or more exhaust camshafts (not shown) configured to operate exhaust valves (not shown) of the cylinders 108. Exhaust gas resulting from combustion is expelled from the cylinders 108 into respective exhaust systems 140a and 140b (collectively "exhaust systems 140"), which treat the exhaust gas before releasing it to the atmosphere. Exhaust gas oxygen (O2) concentration sensors 144a and 144b (collectively "exhaust gas oxygen concentration sensors") are each configured to measure an oxygen concentration of the exhaust gas in their respective exhaust systems 140. Thus, cylinder bank 112a is associated with exhaust system 140a and sensor 144a, and cylinder bank 112b is associated with exhaust system 140b and sensor 144b. This is also commonly referred to as a dual exhaust system. In one exemplary implementation, the exhaust gas oxygen concentrations are utilized as part of the control techniques of the present disclosure. A controller 148 is configured to control the engine system 100, including performing at least a portion of these control techniques, which are more fully described below. In one exemplary implementation, the controller 148 includes one or more processors and is associated with a non-volatile memory 150, such as an electrically erasable programmable read-only memory (EEPROM).

Figure 2:
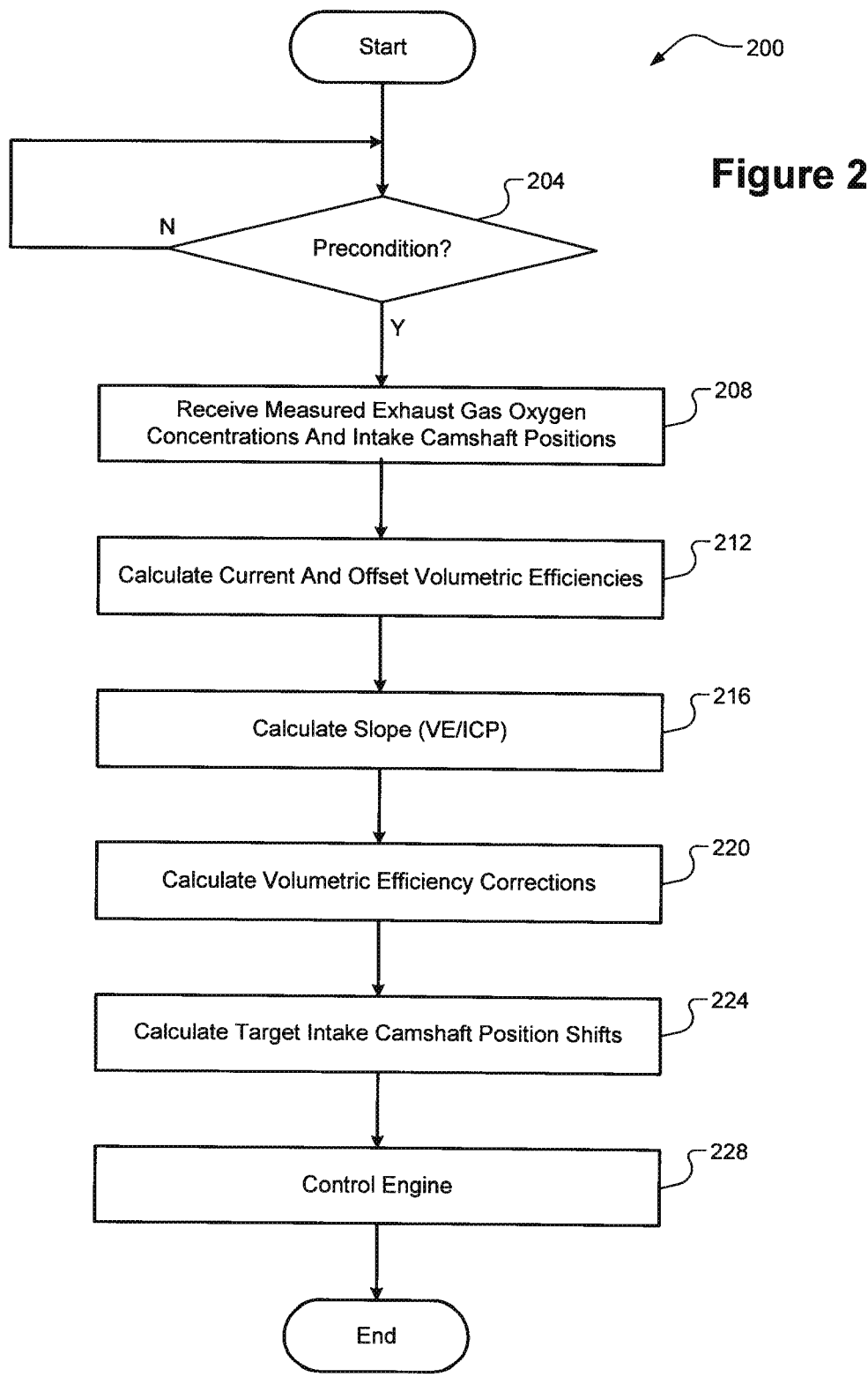
FIG. 2 is a flow diagram of an example method of performing bank-to-bank airflow balancing according to the principles of the present disclosure.

Referring now to FIG. 2, a flow diagram of an example method 200 for performing bank-to-bank airflow balancing is illustrated. The method 200 is described as being implemented at least partially by the controller 148. It will be appreciated, however, that any suitable controller 148 could be utilized in implementing the method 200 (e.g., a stand-alone VVL controller). In one exemplary implementation, the method 200 is performed when a new vehicle is initially driven in response to the setting of an on-board diagnostic (OBD) flag, such as a fault or error. In another exemplary implementation, the method 200 is performed after the engine 104 has been serviced, which could have resulted in movement/shifting of the intake camshafts 128. Thus, a re-learn of the intake camshaft position shifts is performed.

At 204, the controller 148 determines whether a precondition is satisfied for performing bank-to-bank airflow balancing. While referred to as a single precondition, it will be appreciated that the precondition could include a plurality of preconditions being satisfied. One example precondition is the V engine 104 operating in the low lift mode due to the linear relationship between engine volumetric efficiency and intake camshaft position during the low lift mode. As previously mentioned, other example preconditions may be required, such as parameters being indicative of the V engine 104 being in a stable operating condition. This stability precondition may ensure that the V engine 104 is as conducive as possible to producing accurate measurements for the airflow balancing. The parameters used for determining if the engine 104 is operating in the stable state which is acceptable for cylinder bank-to-bank balancing are compared to calibratable and/or predetermined criteria to determine if each individual parameter meets the requirements for cylinder bank-to-bank balancing.

For example, there are minimum and maximum engine speed thresholds, and there are certain combinations of intake camshaft positions and exhaust camshaft positions which are acceptable for the bank-to-bank balancing techniques to be implemented. Some of the criteria utilize timers to establish whether or not the parameter has been in range for a desired amount of time. For example, the criteria for the exhaust gas oxygen concentration sensor feedback integral error term utilizes such a timer. This term indicates the error between the actual airflow and modeled airflow. This term is required to be held below a predetermined threshold for a period of time before the bank-to-bank balancing techniques are implemented. This ensures that the airflow correction term which the bank-to-bank balancing techniques utilize to determine required camshaft position shifts has learned enough to be a reliable indicator of cylinder bank-to-bank airflow imbalance.

Non-limiting examples of these parameters indicative of stability include: engine speed; engine speed roughness; engine runtime; airflow; intake cam position; exhaust cam position; engine oil temperature; engine coolant temperature; exhaust gas recirculation (EGR) mass flow; air charge temperature; VVL current state; VVL future state; ethanol fuel percent; exhaust O2 sensor integral error; variable valve timing (VVT) fault status; camshaft/crankshaft position sensor error learned status (CCDIFF); individual cylinder fuel control enabled status (ICFC); a combination of engine speed and a ratio of intake manifold pressure to barometric pressure; and volumetric efficiency correction enabled status. As previously mentioned, it will be appreciated that other parameters may be utilized as part of the precondition.

When the precondition is satisfied at 204, the method 200 proceeds to 208. Otherwise, the method 200 ends or returns to 204. At 208, the controller 148 receives measured exhaust gas oxygen concentrations from the exhaust gas oxygen concentration sensors 144 and measured intake camshaft positions from the intake camshaft position sensors 130. At 212, the controller 148 calculates current and offset volumetric efficiencies of the engine 104. The current volumetric efficiency is calculated based on the current intake camshaft positions, which are measured by the intake camshaft position sensors 130. Volumetric efficiency is a normalized indicator of engine airflow. Rather, it is the actual mass of air inducted by the engine divided by the amount of air which could have been inducted at ideal reference conditions (either intake manifold or atmospheric conditions). In one exemplary implementation, the intake camshaft centerline positions are a function of VVT cam phaser, crankshaft, and timing chain positions.

As previously mentioned, in one exemplary implementation, the engine control system utilizes an ANN model to continuously compute the engine's VE. The inputs to the ANN are intake and exhaust camshaft centerline positions, engine speed, and a ratio of intake manifold pressure to barometric pressure (also known as "engine p-ratio"). Using the measured intake camshaft positions, the output of the ANN is the current volumetric efficiency of the engine 104. The offset volumetric efficiency is similarly computed by passing an offset intake camshaft position through the ANN. This then produces an offset volumetric efficiency. In one exemplary implementation, this offset is a calibratable amount from the current intake camshaft positions. For example only, the offset may be approximately two degrees. The volumetric efficiency calculations are performed by an algorithm (which houses the ANN) based on a request in connection with the bank-to-bank balancing methodology/algorithm. The calculated offset volumetric efficiency is utilized by the bank-to-bank balancing methodology for the intake camshaft position shift calculation.

At 216, the controller 148 calculates a slope representing a ratio of (i) a difference between the offset and current volumetric efficiencies and (ii) a difference between the offset and current intake camshaft positions. As briefly discussed above, it has been determined that the relationship between volumetric efficiency and intake camshaft centerline position is highly linear when the engine is operating in low valve lift mode. Therefore, using the current intake cam position and the current volumetric efficiency, along with the offset intake cam position and calculated offset volumetric efficiency, the volumetric efficiency (VE) to intake camshaft position (ICP) slope can be computed as follows:

Slope=(Offset VE−Current VE)/(Offset ICP−Current ICP).

In one exemplary aspect, this slope is then used along with bank-specific volumetric efficiency correction terms to directly compute the required intake camshaft position shifts to balance the cylinder bank-to-bank airflow.

At 220, the controller 148 calculates the bank-specific volumetric efficiency corrections using the measured exhaust gas oxygen concentrations from the exhaust gas oxygen concentration sensors 144. The ANN computes the modeled volumetric efficiency of the engine 104 and the measured exhaust gas oxygen concentrations are an indicator of the error between the modeled volumetric efficiency and the actual volumetric efficiency of each bank 112. In other words, the volumetric efficiency corrections are an adjustment to the modeled volumetric efficiency that brings it in line with the actual volumetric efficiency of each bank 112. Since each bank has a unique volumetric efficiency correction, if they are different, then the banks 112 must be flowing different amounts of air. In other words, if the volumetric efficiency corrections are equalized, then the bank-to-bank airflow will also be equalized.

Therefore, using the slope and the volumetric efficiency corrections (VE CORR) for each cylinder bank 112, the camshaft position shift required to balance the bank-to-bank airflow can be determined or computed by the controller 148 at 224 as follows:

BANK-1_SHIFT_RAW (shift required to get to zero VE_CORR)=VE_CORR_BANK-1/Slope;

BANK-2_SHIFT_RAW (shift required to get to zero VE_CORR)=VE_CORR_BANK-2/Slope;

BANK-1_SHIFT=(BANK-1_SHIFT_RAW−BANK-2_SHIFT_RAW)/2; and

BANK-2_SHIFT=−1*(BANK-1_SHIFT).

This calculation can be referred to as a midway method because it determines the total intake camshaft position shift required and then splits it between both banks, where the cams are adjusted by a single target intake camshaft position in opposite directions. In one exemplary implementation, in order to ensure stability and mitigate any oscillatory behavior (over shifts and with subsequent compensation), the computed camshaft position shifts are multiplied with a gain, so that for any new position shift calculation, the position shift applied is slightly less than the computed required value. Each incremental position shift is then accumulated with the total applied position shift to become the new total position shift; therefore the position shift is essentially an integral term.

At 228, the controller 148 controls the offset of the intake camshafts based on the target intake camshaft positions (i.e., the current intake camshaft positions adjusted by their respective position shifts). As this is software-based, applying the intake camshaft position shifts involves utilizing the shifted intake camshaft positions instead of default intake camshaft positions. That is, the shifted or modified intake camshaft positions are utilized by the controller 148 (e.g., other algorithms) and/or other controllers/algorithms in operating the engine 100. The method 200 then ends or returns to 204 for one or more additional cycles. In one exemplary implementation, the controller 148 performs the method 200 a number of times to obtain intake camshaft position shift data for an array of engine operating conditions, and the controller 148 then obtains the final intake camshaft position shifts for the intake camshaft positions based on some combination of the stored intake camshaft position shift data. This is now described in greater detail below.

While the bank-to-bank algorithm is executing on one or more processors associated with the controller and/or control system, a difference in the volumetric efficiency corrections is constantly being monitored by the controller 148. If this difference is held below a predetermined threshold for a required period of time, then the current intake camshaft position shifts being applied are stored in memory for the current engine operating region (CELL_ID). In one exemplary implementation, the CELL_ID is a value between 0-25 (i.e., 26 cells). Each value indicates a particular combination of engine p-ratio and engine speed. There is a unique volumetric efficiency correction linked to each CELL_ID. Since the bank-to-bank airflow imbalance is primary related to engine component tolerance issues (as discussed above), the required amount of intake camshaft position shift should theoretically be very similar or the same for each CELL_ID. The computed camshaft position shifts based on engine speed and p-ratio regions are stored, where each region is indicated by CELL_ID. To establish what the required camshaft position shift is for the engine, it will not be necessary to learn camshaft position shifts for all the CEL- L_ID operating regions. Additionally, some CELL_ID operating regions may be unstable or produce less than optimal VE_CORR feedback. Thus, the required amount of CELL_IDs needed to build confidence in the final camshaft position shifts may be less than the total possible number of CELL_IDs.

Once the required CELL_IDs have learned camshaft position shifts, the final camshaft position shift is computed. In one exemplary implementation, the final camshaft position shifts are the average of all of the stored camshaft position shifts. If the final camshaft position shifts have been computed, then the operating state changes. This is the transition point from the active learning mode to a passive monitoring mode. If the final camshaft position shifts have not yet been computed, then every time the bank-to-bank balance calculation routine is executed, the new camshaft position shifts are accumulated with previous camshaft position shifts and then applied directly to the current camshaft positions. If the final camshaft position shift has been computed, then this continuous adaption is disabled. If all the required CELL_ID operating regions have learned camshaft position shifts, then the average of these learned camshaft position shifts is computed and applied permanently to the actual intake cam positions. The continuous adaption routine is disabled at this time, and what remains active is a set of monitors that look for conditions which might require a re-learn of the camshaft position shifts. For example, as previously discussed, conditions such as maintenance being performed on the camshafts or after a significant amount of engine hours/miles have been accumulated may require the re-learn.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine having two banks of cylinders associated with two intake camshafts, the system comprising:
   intake camshaft position sensors each configured to measure a current position of a respective intake camshaft;
   exhaust gas oxygen concentration sensors each configured to measure an oxygen concentration of an exhaust gas produced by a respective cylinder bank; and
   a controller configured to detect a precondition for performing engine airflow balancing and, in response to detecting the precondition:
      based on the current intake camshaft positions and offset intake camshaft positions, calculate current and offset volumetric efficiencies of the engine, the offset intake camshaft positions being a calibratable offset from the current intake camshaft positions;
      calculate a slope representing a ratio of (i) a difference between the offset and current volumetric efficiencies and (ii) a difference between the offset and current intake camshaft positions;
      based on the respective exhaust gas oxygen concentrations, calculate a volumetric efficiency correction corresponding to each cylinder bank;
      based on the slope and the volumetric efficiency corrections, calculate target intake camshaft position shifts; and
      based on the target intake camshaft position shifts, control offsets of the intake camshafts.

2. The system of claim 1, wherein the controller is further configured to:
   calculate a ratio of each volumetric efficiency correction to the slope to obtain raw intake camshaft position shifts, wherein each raw intake camshaft position shift is configured to cause airflow balance between the cylinder banks; and
   calculate half of a difference between the raw intake camshaft position shifts to obtain a single target intake camshaft position shift for each intake camshaft.

3. The system of claim 2, wherein the controller is configured to control the offsets of the intake camshafts by:
   offsetting a first one of the intake camshafts by the single target intake camshaft position shift in a first direction; and
   offsetting a second one of the intake camshafts by the single target intake camshaft position shift in a second direction opposing the first direction.

4. The system of claim 3, wherein the controller is further configured to apply a gain to the single target intake camshaft position shift such that the offsetting of the first and second intake camshafts is performed incrementally by accumulating portions of the intake camshaft position shifts with previous intake camshaft position shifts.

5. The system of claim 1, wherein the controller is further configured to, subsequent to the controlling:
   recalculate, based on the exhaust gas oxygen concentrations, the volumetric efficiency corrections; and
   compare a difference between the recalculated volumetric efficiency corrections to a threshold indicative of an acceptable difference in volumetric efficiencies between the cylinder banks,
   wherein the controller is configured to store the target intake camshaft position shifts when the difference between the recalculated volumetric efficiency corrections is below the threshold.

6. The system of claim 5, wherein the controller is configured to store, in a cell of a memory, the target intake camshaft position shifts with respect to a particular combination of (i) engine speed and (ii) a ratio of engine intake manifold pressure to barometric pressure.

7. The system of claim 6, wherein the controller is further configured to determine whether a predetermined number of cells of the memory are filled with target intake camshaft position shifts each with respect to a different combination of (i) engine speed and (ii) the ratio of engine intake manifold pressure to barometric pressure.

8. The system of claim 7, wherein in response to determining that the predetermined number of cells of the memory are filled, the controller is further configured to calculate final target intake camshaft position shifts by calculating an average of all the respective target intake camshaft position shifts stored in the memory.

9. The system of claim 8, wherein the controller is further configured to utilize the final target intake camshaft position shifts when determining the intake camshaft positions.

10. The system of claim 1, wherein the controller is further configured to calculate the current and offset volumetric efficiencies based further on (i) centerline positions of the intake camshafts, (ii) engine speed, and (iii) a ratio of engine intake manifold pressure to barometric pressure.

11. A method for operating an engine having two banks of cylinders associated with two intake camshafts, the method comprising:
   receiving, by a controller from intake camshaft position sensors, current positions of respective intake camshafts;

receiving, by the controller from exhaust gas oxygen concentration sensors, oxygen concentrations of an exhaust gas produced by respective cylinder banks;

detecting, by the controller, a precondition for performing engine airflow balancing; and in response to detecting the precondition:

based on the current intake camshaft positions and offset intake camshaft positions, calculating, by the controller, current and offset volumetric efficiencies of the engine, the offset intake camshaft positions being a calibratable offset from the current intake camshaft positions;

calculating, by the controller, a slope representing a ratio of (i) a difference between the offset and current volumetric efficiencies and (ii) a difference between the offset and current intake camshaft positions;

based on the respective exhaust gas oxygen concentrations, calculating, by the controller, a volumetric efficiency correction corresponding to each cylinder bank;

based on the slope and the volumetric efficiency corrections, calculating, by the controller, target intake camshaft position shifts; and based on the target intake camshaft position shifts, controlling, by the controller, offsets of the intake camshafts.

12. The method of claim 11, further comprising:

calculating, by the controller, a ratio of each volumetric efficiency correction to the slope to obtain raw intake camshaft position shifts, wherein each raw intake camshaft position shift is configured to cause airflow balance between the cylinder banks; and calculating, by the controller, half of a difference between the raw intake camshaft position shifts to obtain a single target intake camshaft position shift for each intake camshaft.

13. The method of claim 12, controlling the offsets of the intake camshafts includes:

offsetting, by the controller, a first one of the intake camshafts by the single target intake camshaft position shift in a first direction; and offsetting, by the controller, a second one of the intake camshafts by the single target intake camshaft position shift in a second direction opposing the first direction.

14. The method of claim 13, further comprising applying, by the controller, a gain to the single target intake camshaft position shift such that the offsetting of the first and second intake camshafts is performed incrementally by accumulating portions of the intake camshaft position shifts with previous intake camshaft position shifts.

15. The method of claim 11, further comprising subsequent to the controlling:

recalculating, by the controller based on the exhaust gas oxygen concentrations, the volumetric efficiency corrections; and comparing, by the controller, a difference between the recalculated volumetric efficiency corrections to a threshold indicative of an acceptable difference in volumetric efficiencies between the cylinder banks, wherein the controller is configured to store the target intake camshaft position shifts when the difference between the recalculated volumetric efficiency corrections is below the threshold.

16. The method of claim 15, wherein the controller is configured to store, in a cell of a memory, the target intake camshaft position shifts with respect to a particular combination of (i) engine speed and (ii) a ratio of engine intake manifold pressure to barometric pressure.

17. The method of claim 16, further comprising determining, by the controller, whether a predetermined number of cells of the memory are filled with target intake camshaft position shifts each with respect to a different combination of (i) engine speed and (ii) the ratio of engine intake manifold pressure to barometric pressure.

18. The method of claim 17, further comprising in response to determining that the predetermined number of cells of the memory are filled, calculating, by the controller, final target intake camshaft position shifts by calculating an average of all the respective target intake camshaft position shifts stored in the memory.

19. The method of claim 18, further comprising utilizing, by the controller, the final target intake camshaft position shifts when determining the intake camshaft positions.

20. The method of claim 11, further comprising calculating, by the controller, the current and offset volumetric efficiencies based further on (i) centerline positions of the intake camshafts, (ii) engine speed, and (iii) a ratio of engine intake manifold pressure to barometric pressure.

* * * * *